July 31, 1934.  H. M. STOLLER  1,968,429

SOUND PICTURE APPARATUS

Filed Dec. 23, 1932

INVENTOR
H. M. STOLLER
BY
G. H. Heydt.
ATTORNEY

Patented July 31, 1934

UNITED STATES PATENT OFFICE 1,968,429

SOUND PICTURE APPARATUS

Hugh M. Stoller, Mountain Lakes, N. J., assignor to Bell Telephone Laboratories, Incorporated, New York, N. Y., a corporation of New York Application December 23, 1932, Serial No. 648,687

6 Claims. (Cl. 271—2.3)

This invention relates to sound picture recording and reproducing systems and more particularly to devices for maintaining constant film velocity in such systems.

It has heretofore been proposed to reduce the weight of sound picture mechanism. One of the principal problems which has presented itself in this endeavor has been to provide for a constant film velocity at the point of sound translation. Slight irregularities in the driving mechanism or in the film are responsible for velocity variations which must be overcome to maintain the film at constant velocity. In a majority of systems in use at present a flywheel is mounted on the sound sprocket shaft to resist velocity variations by its kinetic energy. An elastic member is used as the final driving contact at the sound sprocket. The flywheel and elastic member combine to minimize relative motion or angular velocity changes at the sound sprocket caused by irregularities in driving mechanism, the phenomena commonly known as "flutter" and film structural irregularities which bring about load variations. This flywheel is of considerable mass, weighing 25 pounds or more in order to absorb low frequency velocity variations.

Driving mechanism irregularities vary in velocity starting with the cyclic variations of the motor and including cyclic variations of interconnecting shafts, bearings and gears. The driving mechanism insofar as the sound sprocket is concerned terminates in a pair of gears directly associated with the sound sprocket shaft. Any irregularities in the latter gears cause a low frequency variation in the nature of a 6-cycle velocity variation. The irregularities range in frequency from approximately 6 to 20 cycles. An elastic member is ordinarily used between the latter set of gears and the sound sprocket to minimize the transmission of angular velocity variations and oscillations produced thereby, to the sound sprocket. The film pad or other means provided to maintain the film under a yielding tension at the area of sound translation is principally responsible for load irregularities impressed directly upon the sound sprocket. These load irregularities are caused by film splices and other film structure irregularities which produce velocity variations, the lowest of which are approximately 6 cycles. Some of the velocity variations impressed upon the film are of such frequency that the resulting sound pitch variations are inaudible. These variations, however, produce audible effects due to the modulation of the higher frequencies which are reproduced. This effect causes the phenomena commonly known as "flutter". A sensitivity curve showing the effect of flutter frequencies on the ear indicates that this flutter is most objectionable at a frequency range from 1 to 3 cycles. This curve further indicates that at 6 cycles, which is the lowest flutter frequency, apparent in sound picture apparatus, the ear is only half as sensitive as it is to flutter frequencies from 1 to 3 cycles. The curve assumes a flatter characteristic from 6 to 10 cycles and indicates that the flutter is noticeable in a diminishing degree within this frequency range. At higher flutter frequencies the ear is much less sensitive. The suppression of velocity variations and the resulting flutter requires the use of a device sensitive to frequency irregularities in the range of 6 to 10 cycles per second. The size of a flywheel employed for this purpose is consequently governed by these low frequency requirements. A flywheel having sufficient moment of inertia to meet these requirements will have a much greater amount of inertia than is necessary to meet any requirements at higher frequencies.

The object of this invention is therefore to provide in a sound picture mechanism a comparatively light centrifugally operable mechanism comprising weights with a spring member acting against centrifugal force for controlling relative motion of the sound sprocket in which the natural frequency of said mechanism approximately coincides with the frequency of the lowest velocity variation and in which the dynamic characteristic is so regulated as to suppress angular velocity disturbances in the low frequency range by kinetic energy plus potential spring energy and in the higher frequency range substantially by kinetic energy alone.

In accordance with the present invention, a particular form of governor is mounted on the sound sprocket shaft in place of the usual flywheel. This governor comprises weights supported at the end of bell cranks pivoted to a member attached to the sprocket shaft. The weights are centrifugally operated under the control of a spring member. The mechanism is tuned by regulation of the spring member in accordance with the damping effect created in the bell crank arms to multiply the effectiveness of the dynamic characteristic for suppressing disturbances in the low frequency range by kinetic energy plus potential spring energy at the operating speed of the machine. A governor arranged in this manner may be approximately 4% of the weight of a flywheel and accomplish the same or increased effectiveness for obtaining constant film velocity.

In the description of this sound picture mechanism, uniform velocity of the sound sprocket at operating speed is assumed as a zero factor. When the sprocket is rotating at a uniform velocity, it may then be assumed to be in a state of relative rest and the velocity variations are assumed to be relative motion. This relative motion may be otherwise termed an angular velocity variation. Consideration is therefore given only to the effect of velocity variations, insofar as they affect the sprocket, during the period when the sound sprocket and film are moved at operating speed. At this time the centrifugal force of the weights causes them to rotate in a relatively large circle. The position of the weights with relation to this circle tends to vary upon the introduction of velocity variations which cause sudden inward or outward movements which resist and tend to overcome the relative motion of the sprocket.

Figure 1:
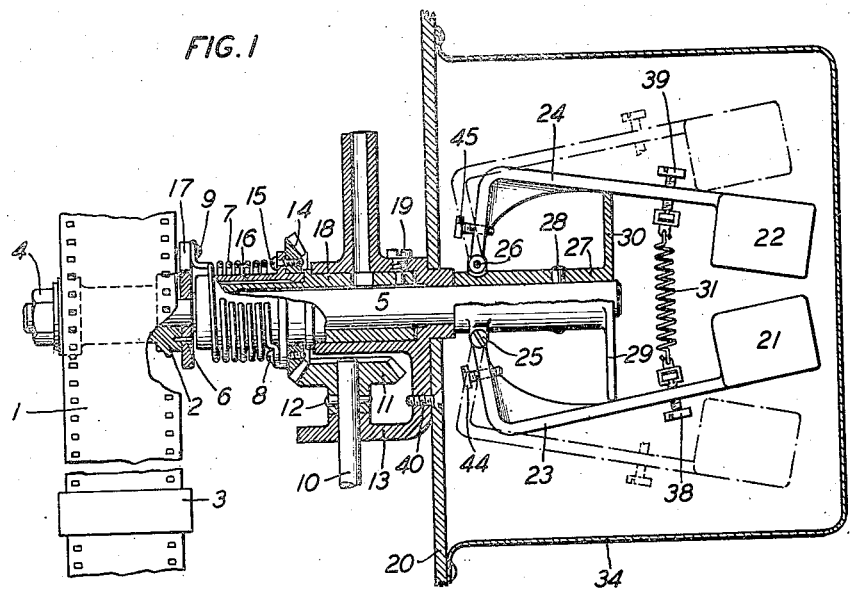
Fig. 1 illustrates the film driving mechanism according to the invention.

The driving motor, shafts, intermittent motion, etc. of the sound picture apparatus are of conventional design and therefore have not been disclosed. The electric motor is ordinarily run at 20 revolutions per second and is connected through a gear set to the various shaftings for driving individual units of the sound picture apparatus. The gear set is arranged to regulate the speed at which the individual units are driven. Gear 11, for example, is connected by shaft 10 to a gear in the gear set which is ordinarily driven six revolutions per second. Gear 11 meshes with gear 14 and thus any irregularities in the structure of either of these gears produce velocity variations at a frequency of six cycles per second. Gear 14 is fastened by screws 15 to a sleeve 16, which sleeve is journaled on the stationary housing 18 supported by housing 13. Housing 13 is supported by the sound apparatus casing, screw 40 being shown for connecting this housing to a portion of the apparatus casing 20. An elastic member shown in the form of a spring 7 is connected between sleeve 16 and circular plate 17 which is rigidly fastened to sprocket 2 by pin 6. The elastic member may be made in any of the forms used with flywheels, but may be considerably lighter and more resilient, in conformity with the great decrease in the weight of the inertia member. The elastic member may also be damped in any well known manner by the use of frictional resistance. The sprocket 2 and circular plate 17 are held in position on sound sprocket shaft 5 by nut 4. The sprocket 2 and shaft 5 are thus driven approximately six revolutions per second under the control of the elastic filter and advance film 1 past the sound translating apparatus 3. The sound translating apparatus is of conventional form and therefore is only schematically disclosed. The shaft 5 rotates in the journal bearing provided in housings 18 and 13.

The control mechanism connected to shaft 5 is mounted within the protective casing 34. A sleeve 27 provided with lugs 42 and 43 and radial extensions 29 and 30 which act as stops for the bell crank arms 23 and 24 is rigidly fastened to the sprocket shaft 5 by pin 28. The weight members 21 and 22 are disclosed as integral with the bell crank arms 23 and 24. These weights may be separate members rigidly connected to the bell crank arms. Each bell crank arm is pivoted on a pin 41 having a screw thread for maintaining a close relation between lugs 42 and 43 and the side bearing surfaces of the bell crank arm to provide frictional resistance at this bearing. Spring 31 is connected between the bell crank arms for controlling the movement of the weights as hereinafter described. The spring 31 is connected to adjusting members 38 and 39 which are used to obtain an accurate correlation between the spring member and the weights in order that the potential spring energy and kinetic energy be such that at operating speed the natural period of this mechanism coincides with the frequency of the lowest frequency velocity variation which affects sound translation.

Figure 3:
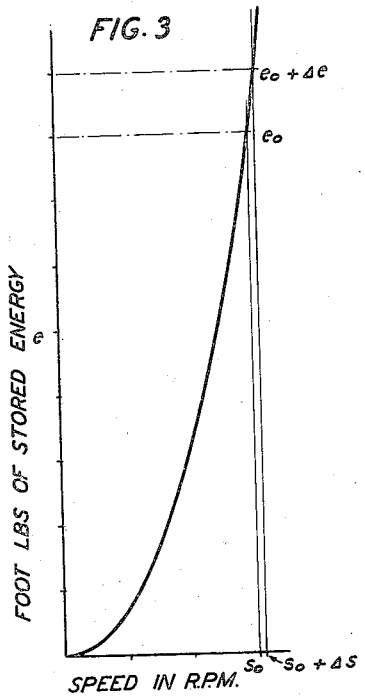
Fig. 3 shows the relationship between stored energy and speed in an ordinary flywheel.
Figure 2:
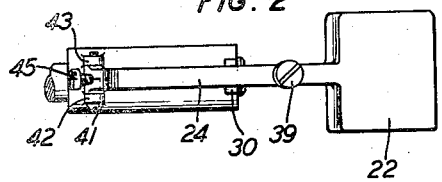
Fig. 2 is a plan view of the governor weights and bell crank illustrated in Fig. 1.
Figure 4:
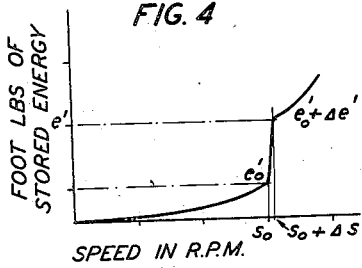
Fig. 4 shows the relationship between stored energy and speed in the governor according to the invention.

In Fig. 3 the relationship between stored energy and speed of an ordinary fly-wheel is shown. This characteristic is a parabola, the energy being proportional to the square of the speed. The corresponding characteristic of the spring governor of the invention is shown in Fig. 4. Up to the minimum operating speed $S_0$ this characteristic is also a parabola. At this speed the weights 21 and 22 start to fly out and the characteristic then assumes an almost perpendicular slope to the upper limits of the operating range at speed $S_0+\Delta S$. From this point the characteristic again becomes parabolic. If in Figs. 3 and 4 the slopes of the characteristics between the speed range from $S_0$ to $S_0+\Delta S$ are made equal, it is evident that if the speed of the shaft and sound sprocket being controlled is increased a minute amount the stored energy in either the fly-wheel or the governor-type mechanism will be increased a like amount. Each device therefore is equally effective in suppressing irregularities in shaft speed, except for certain dynamic effects peculiar to the governor-type which are hereinafter discussed. A comparison of Figs. 3 and 4 indicates that the total amount of kinetically stored energy in the rotating system is much greater in Fig. 3 (the ordinary fly-wheel), as compared with that in Fig. 4. In other words, the moment of inertia and mass of the fly-wheel are relatively large as compared with that of the governor-type mechanism.

*Quantitative analysis*

Referring to Fig. 3 (the ordinary fly-wheel), let the kinetically stored energy at speed $S_0$ be $e_0$, and at speed $S_0+\Delta S$ let the kinetically stored energy be $e_0+\Delta e$. Since, in general, the energy is proportional to the square of the speed, the energy $e$ at any speed $S$, will be $e=K_1S^2$. When $e=e_0$, $S=S_0$, we have $$e_0 = K_1 S_0^2$$

or $$K_1 = \frac{e_0}{S_0^2}.$$

Thus, in general, $$e = \frac{e_0 S^2}{S_0^2}.$$

When $$S = S_0 + \Delta S$$

and $$e = e_0 + \Delta e,$$

$$e_0 + \Delta e = \frac{e_0}{S_0^2}(S_0+\Delta S)^2 = \frac{e_0}{S_0^2}(S_0^2+2S_0\Delta S) = e_0 + \frac{2e_0\Delta S}{S_0}$$

$$\Delta e = 2\Delta S \frac{e_0}{S_0} = \Delta e' \text{ by hypothesis} \quad \text{(Equation 1)}$$

In Fig. 4 the increment $\Delta e'$ consists of two approximately equal parts; increased energy stored in the spring and increased kinetic energy stored in the weights due to the increase in their radius of gyration as the weights move outward. The total kinetic energy of the weights alone at the speed $S = S_0 + \Delta S$ is therefore $$e_o' + \tfrac{1}{2}\Delta e'.$$

Let it be assumed that the radius of gyration $R_0$ of the weights at speed $S_0 + \Delta S$ is equal to that of the fly-wheel, then the ratio of the masses of the governor mechanism $(m')$ and flywheel $(m)$ will be equal to the ratio of their stored energy $$\frac{m'}{m} = \frac{e_o' + \tfrac{1}{2}\Delta e'}{e_o + \Delta e}.$$

Or since $\Delta e$ is small compared to $e_0$ we may write approximately $$\frac{m'}{m} = \frac{e_o' + \tfrac{1}{2}\Delta e'}{e_o}.$$

Let R = the ratio of the radius of gyration of the weights in their innermost position to the radius of gyration in their outermost position. Then at speed $S_0$ we have the following ratio of stored energy $$\frac{e_o'}{e_o} = \frac{m'}{m} R^2$$

or $$e_o' = \frac{m'}{m} R^2 e_o.$$

Substituting this in the above equation, and for $\Delta e'$ from Equation 1 we have $$\frac{m'}{m} = \frac{\frac{m'}{m} R^2 e_o + \Delta S \frac{e_o}{S_o}}{e_o} = R^2 \left(\frac{m'}{m}\right) + \frac{\Delta S}{S_o}$$

$$\frac{m'}{m}(1 - R^2) = \frac{\Delta S}{S_o}$$

or $$\frac{m'}{m} = \frac{\Delta S}{S_o(1 - R^2)} \qquad \text{(Equation 2)}$$

For illustration, consider a particular case in which the scale shown in Figs. 3 and 4 represent proportional values. Assume thus $$\Delta S = .03 \, S_o \text{ and } R = .7$$

$$\frac{m'}{m} = \frac{\Delta S}{S_o(1 - R^2)} = \frac{.03 \, S_o}{S_o(1 - .5)} = \frac{.03}{.5} = .06$$

Insofar as the quantitative analysis and formula have progressed, the weight ratio of the governor mechanism to a fly-wheel for suppressing equivalent angular velocity variations of the shaft and sound sprocket is approximately 6 per cent. The governor mechanism at this point will be equally effective, provided the frequency of the disturbance to be suppressed is such that the natural period of the governor does not introduce dynamic effects, as hereinafter discussed.

The travel, $T_0$, of the governor's weight is obtained from the relation $$T_o = (1 - R) R_o \quad \text{(approximately)} \quad \text{(Equation 3)}$$

*Natural period of governor*

Let it be assumed that the shaft is revolving at a constant speed equal to $S_0 + \tfrac{1}{2} \Delta S$, which is the midpoint of the operating range. If the governor weights are forcibly thrown out by some external means (not shown) to the position they would occupy if the speed were $S_0 + \Delta S$ and then released, the retractile effort of the springs will exceed the centrifugal force of the weights and the weights will be forced inwardly. Due to the effort expended by the spring the weights are moved inwardly with a considerable velocity and will move beyond the point where they would ordinarily be arrested if centrifugal force alone were the governing factor. Several oscillations occur and finally the weights return to their original position. The motion here described is a simple harmonic motion with a decrement dependent upon the frictional damping of the bearings 25 and 26 of the bell crank arms 23 and 24. This frictional damping may be obtained in any known manner. It is assumed for this disclosure that the frictional damping is within the bearing itself, which may be adjusted by the tapered screws 44 and 45. The arms 23 and 24 have saw cuts in the middle extending through the bearings 25 and 26 up to tapered screws 44 and 45. The adjustment of the tapered screws expands the bearing to establish frictional damping between the bearing and lugs 42 and 43.

The frequency of this oscillation may be quantitatively computed as follows:

With the governor weights in their outermost position the retractile force of the spring will be $K_2 (S_o + \Delta S)^2$ where $K_2$ is an undetermined constant; whereas the centrifugal force of the weights will be only $K_2 (S_o + \tfrac{1}{2} \Delta S)^2$ leaving a surplus spring force of $K_2 S_o \Delta S = F$.

The centrifugal force of a weight W at radius of gyration $R_o$ and speed S is $$\frac{WV^2}{g\frac{R_o}{12}} = \frac{12W}{gR_o} \frac{(2\pi R_o S)^2}{(12 \times 60)^2} = K_2 S^2$$

where $R_o$ is in inches and S in R. P. M.

Thus $$K_2 = \frac{W}{g}\left(\frac{R_o}{12}\right)\frac{(2\pi)^2}{(60)^2} = .000917 \frac{WR_o}{g}$$

The surplus spring force $K_2 S_o \Delta S$ will accelerate the weights inwardly and will convert the potential energy of the surplus spring force F into kinetic energy due to inward velocity of the weights. When the neutral position is reached we have the relation that the average value of F times the travel $T_o$ equals this kinetic energy.

Thus $$\tfrac{1}{2}\frac{FT_o}{12} = \frac{W(V')^2}{2g}$$

whence $$V' = \sqrt{\frac{FT_o g}{W12}}.$$

The maximum inward velocity of the weights in feet per second.

The equation of displacement for simple harmonic motion is $$y = r \sin \frac{2\pi}{T} t.$$

(Textbook of Modern Physics, Weld and Palmer, page 290). Where y is the displacement, T the period and r the amplitude of a half vibration $$= \tfrac{1}{2}(1 - R)\frac{R_o}{12}.$$

Since $$V' = \frac{dy}{dt} = \frac{2\pi r}{T} \cos \frac{2\pi}{T} t$$

the maximum value of $V'$ will be $$\frac{2\pi r}{T}.$$

Equating this to the value found above we have $$\frac{2\pi r}{T} = \sqrt{\frac{FT_o g}{12W}}$$

$$f = \frac{1}{T} = \frac{1}{2\pi r}\sqrt{\frac{FT_o g}{12W}}$$

where $f$ is the natural frequency of the governor. But $$F = K_2 S_o \Delta S = .000917 \frac{WR_o}{g} S_o \Delta S$$

and $$T_o = (1-R)R_o$$

and $$r = \frac{T_o}{24}.$$

Substituting these values we obtain $$f = \frac{24}{2\pi(1-R)R_o}\sqrt{.000917\left(\frac{WR_o}{g}\right)S_o \Delta S \frac{(1-R)R_o g}{12W}}$$

$$f = \frac{24}{2\pi}\sqrt{\frac{.000917 S_o \Delta S}{12(1-R)}}$$

$$f = .0334\sqrt{\frac{S_o \Delta S}{1-R}} \quad \text{(Equation 4)}$$

In the particular case of the scalar values of Fig. 3 and Fig. 4 if $$S_o = 360 \text{ R. P. M.}$$

$$\Delta S = .03\, S_o = 10.8 \text{ R. P. M.}$$

$$R = .707$$

$$f = .0334\sqrt{\frac{(360)(10.8)}{.293}} = 3.84 \text{ cycles per second}$$

the natural frequency of the governor.

Dynamic characteristic of governor

Let it be assumed that the shaft is rotating at mean speed of $S_o + \frac{1}{2}\Delta S$ and there is present a sinusoidal pulsation in angular velocity having a frequency equal to the natural period of the governor. The governor will now act as a mechanically tuned circuit and will oscillate at a relatively large amplitude. Let "$q$" be the ratio between this amplitude of governor oscillation, and that produced by a pulsation in shaft speed of equal amplitude, but having a frequency low as compared to the natural frequency of the governor. The damping effect of the governor will then be $q$ times greater for suppressing speed irregularities occurring at a frequency equal to the natural frequency of vibration of the governor than for suppressing irregularities of a frequency remote from the natural period of the governor. The value of $q$ will be greater the less the friction in the rubbing surfaces in the governor bearings. In an electric circuit $$q = \frac{\omega L}{r}$$

where $L$ is the inductance and $r$ the resistance. This is closely analogous to the mechanical relations of mass and friction in the governor.

It is now apparent that in a governor mechanism of minimum mass it is preferable to make its natural frequency coincide with the lowest flutter frequency which it is desired to eliminate, thereby obtaining the advantage of its dynamic characteristic and multiplying its effectiveness by $q$.

The ratio of the mass $m'$ of the governor to the mass $m$ of its equivalent fly-wheel then becomes (from Equation 2)

$$\frac{m'}{m} = \frac{\Delta S}{S_o(1-R^2)q} \quad \text{(Equation 5)}$$

The selection of the best value of $q$ depends upon the magnitude of the next higher flutter frequency. For example, suppose the lowest flutter frequency is 6 cycles and the next is 10 cycles and of half the amplitude. Since the ear is only about half as sensitive at 10 cycles as it is at 6 cycles the damping effect of the governor should be $\frac{1}{2} \times \frac{1}{2}$ or one-fourth as great. "$q$" must then be selected at such a value that the impedance $z_2$ of the mechanically tuned circuit is not more than four times as great at 10 cycles, as its impedance $z_1$ at 6 cycles. Using the electrical analogy for convenience we have $$z_1 = \sqrt{r^2 + \left(W_1 L - \frac{1}{W_1 C}\right)^2} = r$$

since $$W_1 L = \frac{1}{W_1 C}$$

$$z_2 = \sqrt{r^2 + \left(W_2 L - \frac{1}{W_2 C}\right)^2} = 4z_1 = 4r$$

But $$W_1 L = qr$$

and $$\frac{W_2}{W_1} = \frac{10}{6}.$$

Thus $$W_2 L = \frac{10}{6} qr$$

and $$\frac{1}{W_2 C} = \frac{6}{10} qr$$

$$z_2 = \sqrt{r^2 + \left(\frac{10}{6}qr - \frac{6}{10}qr\right)^2} = \sqrt{r^2 + 1.066 q^2 r^2}$$

$$z_2 = 4z_1 = 4r = \sqrt{r^2 + 1.066 q^2 r^2}$$

$$4 = \sqrt{1 + 1.066 q^2}$$

whence $$q = 3.74.$$

Specific example

In the specific case of a particular sound unit in general use, a fly-wheel is used which is 10 inches in diameter, weighs 25 pounds and revolves at 360 R. P. M. The intermediate gearing between the sprocket and the driving motor produces flutter frequencies of 6, 10 and 20 cycles. Since the sprocket revolves at 6 revolutions per second, the lowest flutter frequency is 6 cycles.

A governor mechanism according to the invention may be designed according to the preceding formulæ which will be as effective as the fly-wheel with a fractional amount of the mass. Since the lowest flutter frequency to be eliminated is 6 cycles the natural period of the governor will be 6 cycles.

It will be shown in the following that the governor mechanism replacing the 10-inch diameter 25-pound fly-wheel will comprise a mass approximately 4 per cent of the fly-wheel mass. Consequently let $R=.7$ and $R_0=4''$ and $q=4$.
From Equation 4—

$$f=.0334\sqrt{\frac{S_o \Delta S}{1-R}}=6$$

$$.0334\sqrt{\frac{360\Delta S}{.3}}=6$$

whence
$$\Delta S = 27 \text{ R. P. M.}$$
or
$$\frac{\Delta S}{S_o}=\frac{27}{360}=.075$$

From Equation 5—

$$\frac{m'}{m}=\frac{\Delta S}{S_o(1-R^2)q}=\frac{27}{360(1-.5)4}=.0375$$

Thus the mass of the governor is about 4 per cent of the equivalent fly-wheel.

A governor designed according to the foregoing formula is most effective for the elimination of angular velocity variations of a frequency of 6 cycles. Since, however, the value of $q$ is only 4, the governor will be adequate for eliminating velocity variations of a frequency of 10 cycles. Consequently, the sound pitch variation is maintained below that which is noticeable to hearing. At frequencies higher than 10 cycles the mass of weights 21 and 22 is sufficient to govern the angular velocity variations solely by kinetic energy, since very little mass is required for frequency variations of this character. As previously stated, only a very light inertia member is required to regulate angular velocity variations impressed upon the sprocket by the higher frequency irregularities.

It will be remembered that irregularities are produced by a variation in film load, as set forth earlier in the specification. The frequency of angular velocity variation produced by such load variations is from 6 to 10 cycles. If the natural period of the governor is 6 cycles, it will control velocity variations of the sound sprocket and shaft produced by film variations, as well as those produced by irregularities in the driving mechanism.

It is not the intention to limit the foregoing invention to a driving mechanism solely for films. At the present time in phonograph recording and reproducing it is desirable to use a massive turntable in order to secure uniform angular velocity. This turntable assumes the proportions of a flywheel. Let it be assumed, for example, that the turntable is made only a fraction of the weight of the present turntable and that a governor according to the invention is associated therewith. This governor mechanism may be so designed that the steep portion of the characteristic according to Fig. 4 covers the operating speed range of the turntable.

What is claimed is:

1. In a film driving mechanism including a driven cylinder mounted on a shaft for moving a film at constant velocity for sound translation, a mechanism connected to said shaft for suppressing velocity variations of said cylinder comprising centrifugally operable weights pivoted by bearings to said shaft and a spring member for tensioning said weights toward each other, means to adjust said spring tension and means to regulate the damping quality of said bearings, said adjusting and regulating means together comprising means for tuning said mechanism so that its natural frequency coincides with the lowest frequency velocity variations and its dynamic characteristic is such as to suppress angular velocity variations in the range of said lowest frequency by kinetic energy plus potential spring energy and in the higher frequency range substantially by kinetic energy alone.

2. A method of suppressing angular velocity variations over a range of frequencies in a rotating element having spring tensioned governor weights connected thereto, consisting in tuning said governor mechanism to have its natural frequency coincide with the lowest frequency velocity variation in said range.

3. A method of suppressing angular velocity variations over a range of frequencies in a rotating element having spring tensioned governor weights connected thereto, consisting in tuning said spring tensioned governor mechanism to produce the greatest change in the radius of rotation of said weights and thus the greatest dynamic effect in resonance with the lowest frequency of said range of frequencies.

4. A method of suppressing angular velocity variations over a range of frequencies in a rotating element having spring tensioned governor weights connected thereto, consisting in proportioning the mass of said governor weights to suppress velocity variations of the higher frequencies in said range substantially by kinetic energy alone and in turning said governor mechanism to produce graded dynamic effects in the lower frequencies of said range with the greatest dynamic effect in resonance with the lowest frequency of said range of frequencies for suppressing velocity variations in said lower range of frequencies by kinetic energy plus potential spring energy.

5. A method of suppressing angular velocity variations over a range of frequencies in a cylinder driven at substantially uniform velocity for moving a sound record strip of inconsiderable mass in a sound picture recording or reproducing machine, said method contemplating the use of a spring tensioned governor mechanism having a mass less than 10% of the mass required in case a direct connected flywheel were used, consisting in tuning said spring tensioned governor mechanism so that its natural frequency coincides with the lowest frequency velocity variation in said range of frequencies.

6. A method of suppressing angular velocity variations over a range of frequencies in a cylinder driven at substantially uniform velocity for moving a sound record strip of inconsiderable mass in a sound picture recording or reproducing machine, said method contemplating the use of a spring tensioned governor mechanism having a mass less than 10% of the mass required in case a direct connected flywheel were used, consisting in proportioning the mass of said governor mechanism to suppress velocity variations of the higher frequencies in said range substantially by kinetic energy alone and in tuning said governor mechanism to produce graded dynamic effects in the lower frequencies of said range with the greatest dynamic effect in resonance with the lowest frequency of said range of frequencies for suppressing velocity variations in said lower frequency range by kinetic energy plus potential spring energy.

HUGH M. STOLLER.